E. WESTON.
Rotating Armature for Dynamo Electric Machine.

No. 234,443.  Patented Nov. 16, 1880.

Witnesses:
M. L. Adams
Geo. W. Miatt

Inventor:
Edward Weston,
Per Edw. E. Quimby,
Atty.

UNITED STATES PATENT OFFICE.

EDWARD WESTON, OF NEWARK, NEW JERSEY, ASSIGNOR TO WESTON DYNAMO ELECTRIC MACHINE COMPANY, OF SAME PLACE.

ROTATING ARMATURE FOR DYNAMO-ELECTRIC MACHINES.

SPECIFICATION forming part of Letters Patent No. 234,443, dated November 16, 1880.

Application filed February 18, 1878.

*To all whom it may concern:*

Be it known that I, EDWARD WESTON, of Newark, New Jersey, have invented certain Improvements in Rotating Armatures for Dynamo-Electric Machines, of which the following is a specification. (Case B.)

My improvements relate to the construction of the cores or carriers for the rotating coils in a dynamo-electric machine; and my invention consists, first, in making such cores or carriers hollow and with open ends; and, secondly, in providing a hollow or an annular core or carrier with systems of openings in its periphery, whereby when such carrier or core is rotated air is drawn into the interior space in the core or carrier and discharged therefrom tangentially through the holes in its periphery.

By my invention I utilize the rotation of the armature for the establishment by centrifugal action of powerful currents of air, which not only tend to keep the rotating armature cool, but tend to cool the contiguous portions of the machine.

As my present invention relates solely to the construction of the core or carrier for the rotating coils, and as the use of rotating coils in dynamo-electric machines is well known, I do not deem it necessary to describe any particular dynamo-electric machine.

My present invention will be found useful in any dynamo-electric machine, irrespective of the number of external magnets employed and irrespective of the mode of connecting the coils of such machines in an electric circuit.

The rotating coils of dynamo-electric machines have been usually heretofore wound upon an iron core, and cores so wound are called "armatures;" but in another application which I have made for a patent (now pending) I have described rotating coils wound upon a carrier composed of a non-conducting or diamagnetic material in the form of a hollow cylinder. I therefore wish to have it understood that my present invention is applicable, not only to "armatures," so called, but to all metallic carriers for rotating coils.

Figure 1:
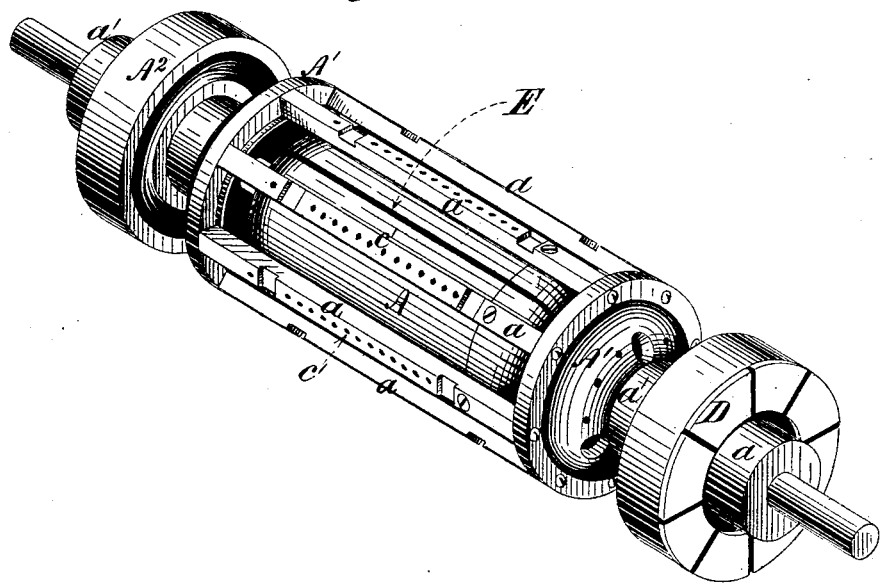
Figure 2:
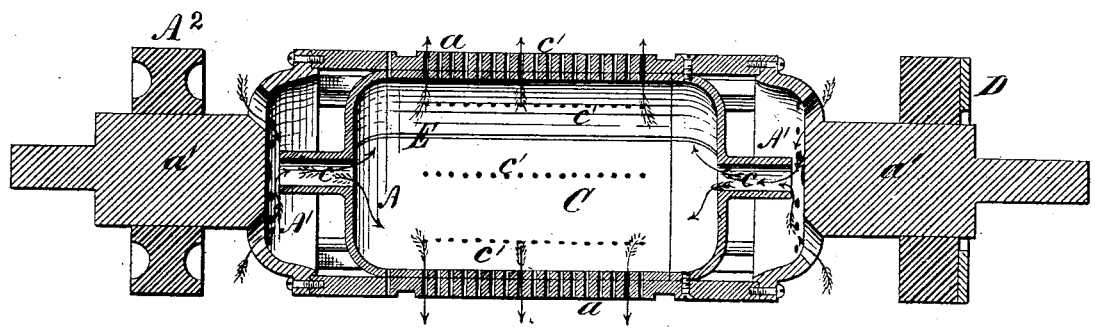

The accompanying drawings, representing a rotating armature or carrier for a rotating coil, are as follows:

Figure 1 is an isometrical perspective of an armature adapted to be rotated in a dynamo-electric machine. Fig. 2 is a central longitudinal section.

The distinctive characteristic of the carrier or shell A upon which the coils B are wound is, that it contains an interior chamber, C, which is provided with an opening, $c$, in each end and systems of openings $c'$ in its periphery. The several coils upon the carrier are separated from each other by the outwardly-projecting ribs $a$. It will be seen that the holes $c'$ extend radially through the ribs. The shell A is secured by the ribs to the concave sides of the disks A′ A′, which are affixed to the shaft $a'$, carrying a commutator, D, the several strips of which are suitably connected with the coils B. The shaft $a'$ is mounted in suitable bearings, and is provided with a pulley, $A^2$, for the reception of a driving-belt. The commutator, driving-pulley, and bearings for the shaft $a'$ are such as are usually employed in dynamo-electric machines.

When the carrier is rotated air will be driven by centrifugal force out of the holes $c'$ in its periphery, and the place of such air will be supplied by air entering through the holes $c$ in the ends, the direction of the current being shown by arrows in Fig. 2. The strong current of air thus established through the hollow carrier or shell A not only cools the carrier, but tends to cool the contiguous portions of the machine.

It will, of course, be seen that my invention is applicable to a Pacinnotti armature, or to any other armature in the form of an annulus, by providing such armature with openings from its interior outward to its periphery.

I claim as my invention—

1. In a dynamo-electric machine, a rotating armature the coils of which are wound upon a hollow core provided with openings in its ends and in its periphery, substantially as and for the purpose set forth.

2. In a dynamo-electric machine, a rotating armature consisting of a series of coils wound upon the hollow carrier or shell A, which is provided with openings $c$ in its ends and openings $c'$ in its periphery, as and for the purpose set forth.

EDWARD WESTON.

Witnesses:
JOHN OTTO,
JOHN C. YOUNG.